United States Patent
Buttolo et al.

(10) Patent No.: US 11,731,170 B2
(45) Date of Patent: Aug. 22, 2023

(54) SYSTEMS AND METHODS FOR DELIVERY VEHICLE RECONFIGURABLE ON-BOARD PACKAGE SORTING

(71) Applicant: Ford Global Technologies, LLC, Dearborn, MI (US)

(72) Inventors: Pietro Buttolo, Dearborn Heights, MI (US); Yifan Chen, Ann Arbor, MI (US); Kurt Lundeen, Wixom, MI (US); John Randolf Vincent, Livonia, MI (US); Timothy Mark Feldkamp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 17/490,551

(22) Filed: Sep. 30, 2021

(65) Prior Publication Data
US 2023/0099899 A1    Mar. 30, 2023

(51) Int. Cl.
*B07C 3/08* (2006.01)
*B07C 3/00* (2006.01)
*B60P 3/00* (2006.01)

(52) U.S. Cl.
CPC ............... *B07C 3/08* (2013.01); *B07C 3/008* (2013.01); *B60P 3/007* (2013.01)

(58) Field of Classification Search
CPC .. B07C 3/08; B07C 3/008; B07C 3/06; B07C 5/34; B07C 5/3412; B60P 3/007; B60P 3/03

(Continued)

(56) References Cited

U.S. PATENT DOCUMENTS 10,783,599 B1 * 9/2020 Hartman ................... B60P 1/36
10,934,093 B2 * 3/2021 Gil ............................. B60P 1/54
(Continued)

FOREIGN PATENT DOCUMENTS

| KR | 101721234 B1 * | 3/2017 | |
| WO | WO-2019037921 A1 * | 2/2019 | ............ B60P 3/007 |
| WO | WO-2020227215 A1 * | 11/2020 | ................ B60P 1/36 |

OTHER PUBLICATIONS

Jaiganesh, V., "Automated Guided Vehicle with Robotic Logistics System", ScienceDirect, Procedia Engineering 97 (2014) 2011-2021—www.sciencedirect.com. (12 pages).

*Primary Examiner* — Gene O Crawford
*Assistant Examiner* — Muhammad Awais
(74) *Attorney, Agent, or Firm* — Brandon Hicks; Eversheds Sutherland (US) LLP

(57) ABSTRACT

The disclosure is generally directed to systems and methods for a reconfigurable on-board package sorting system for a delivery vehicle including an enclosed storage compartment with a horizontal plane, a plurality of bins for holding packages, each bin including a computer readable identifier, a set of correlated conveyor belts on each horizontal plane, the correlated conveyors belts sized as a function of the bins, including at conveyor belts linearly oriented on the horizontal plane, mixing conveyors, each oriented adjacent to each convey belt to provide directional transition to a next conveyor belt, wherein the correlated conveyor belts provide directional movement of the bins in a loop on the horizontal plane by selective rotation of each conveyor belt, and a computer including a processor and memory to receive data from each identifier, the processor including instructions to: identify a location of bin and direct the operation of the correlated conveyor belts.

15 Claims, 14 Drawing Sheets

(58) Field of Classification Search
USPC .......................................................... 209/606
See application file for complete search history.

(56) References Cited

U.S. PATENT DOCUMENTS

| | | | | |
|---|---|---|---|---|
| 10,990,910 | B2* | 4/2021 | Bischoff | G06Q 10/047 |
| 11,119,487 | B2* | 9/2021 | Jarvis | G01C 21/20 |
| 2017/0291766 | A1* | 10/2017 | Orth | B65G 1/1378 |
| 2018/0197139 | A1* | 7/2018 | Hill | H04N 25/67 |
| 2020/0231392 | A1* | 7/2020 | Singh | B65G 61/00 |
| 2021/0200210 | A1* | 7/2021 | Gil | G05D 1/0088 |
| 2021/0209543 | A1* | 7/2021 | Scott | B60R 11/04 |

* cited by examiner

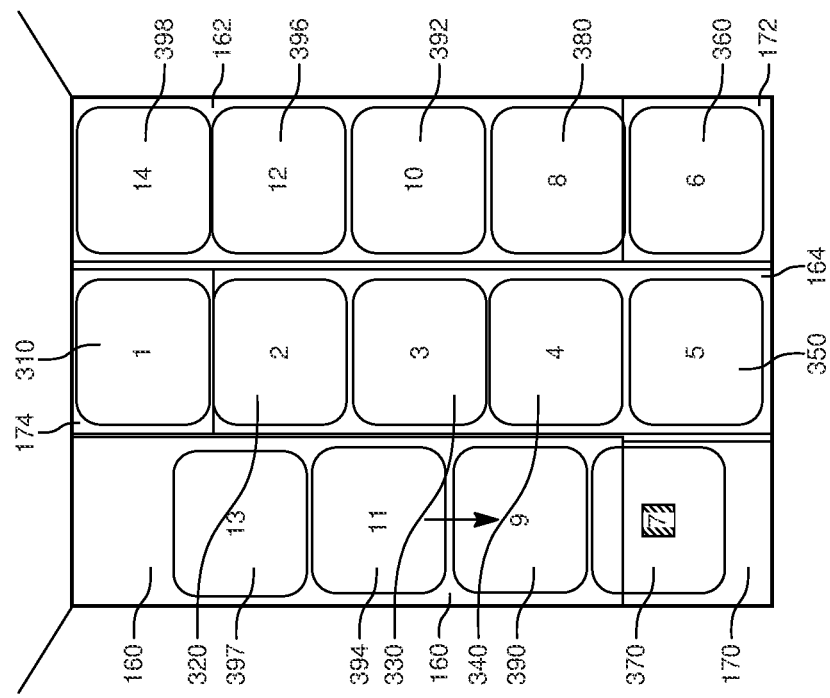
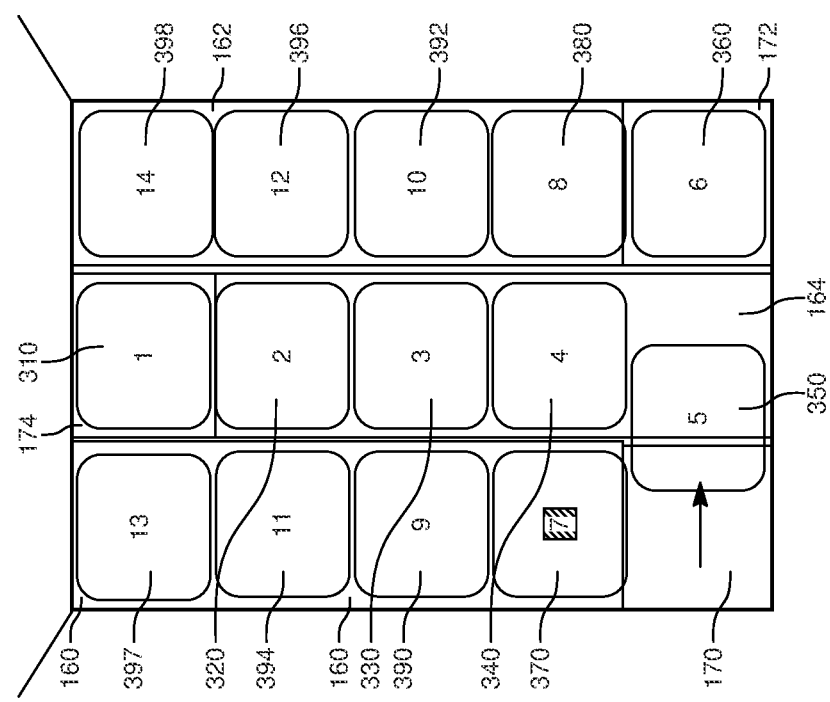

SYSTEMS AND METHODS FOR DELIVERY VEHICLE RECONFIGURABLE ON-BOARD PACKAGE SORTING

FIELD

This disclosure generally relates to vehicles, and more particularly relates to systems and methods for delivery van on-board package sorting.

BACKGROUND

Despite significant developmental efforts in vehicle automation, many delivery vehicles still require a driver of the delivery vehicle to enter the vehicle and individually retrieve each package for delivery.

Proper loading of packages and unloading of packages requires sorting and stocking of packages of different shapes and sizes. Typically, the more varied the package sizing, the more time consuming the stocking and unloading of such packages.

It is desirable to provide solutions that address time consumption and other limitations associated with delivery vehicle on-board package sorting.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 10 illustrates an exemplary layout of bins during unloading within a storage compartment of a delivery vehicle showing in accordance with an embodiment of the disclosure.

FIG. 11 illustrates an exemplary layout of bins during unloading within a storage compartment of a delivery vehicle showing in accordance with an embodiment of the disclosure.

FIG. 6 illustrates a flow diagram of a method in accordance with an embodiment of the disclosure.

DETAILED DESCRIPTION

Overview

Figure 1:
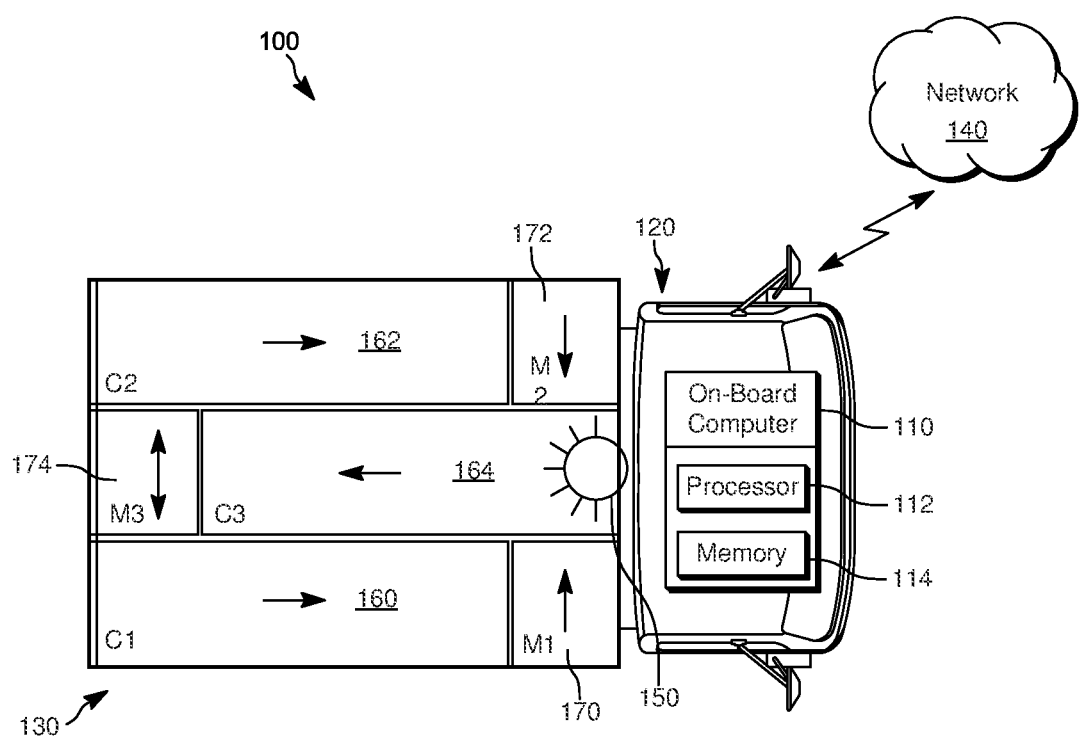
FIG. 1 illustrates an example delivery vehicle on-board package sorting system in accordance with and embodiment of the disclosure.

In terms of a general overview, this disclosure is generally directed to systems and methods for a reconfigurable on-board package sorting system for a delivery vehicle. The system includes an enclosed storage compartment with at least one horizontal plane, a plurality of bins for holding packages, each bin including a computer readable identifier, at least one set of correlated motorized conveyor belts on each horizontal plane, the set of correlated motorized conveyors belts sized as a function of the plurality of bins, including at least two conveyor belts linearly oriented on the horizontal plane, at least two mixing conveyor belts, each mixing conveyor belt oriented adjacent to each conveyor belt to provide directional transition to a next conveyor belt of the at least two conveyor belts, wherein the set of correlated motorized conveyor belts operate to enable loading and unloading of packages by providing directional movement of the bins in at least one loop on the horizontal plane by selective rotation of each motorized conveyor belt. The system further includes an on-board computer including a processor and memory configured to receive data from each computer readable identifier, the processor including instructions to identify a location of each of the plurality of bins, and direct the operation of the set of correlated motorized conveyor belts to selectively operate each motorized conveyor belt to relocate one or more of the bins.

In one or more embodiments, the plurality of bins comprise a plurality of stackable containers, each with the computer readable identifier, the computer readable identifier providing a listing of container dimensions, wherein the listing of container dimensions enables a calculation of stacking height for a combination stackable container to form a column within the enclosed storage compartment.

In one or more embodiments the system includes a door integrated with the storage compartment, and a sliding assembly mounted on an inside of the door, the sliding assembly including at least one pivoting arm configured to slide horizontally and vertically and operable to lift one of the plurality of stackable containers to disengage it from a stack of containers.

In one or more embodiments, each stackable container includes a recessed area for enabling the pivoting arm to attach to one of the stackable containers for access at the door.

In one or more embodiments, the sliding assembly is mounted on an inside of the door and the pivoting arm operates when the door is opened to remove the stackable container for access at the door.

Another embodiment is directed to a method for reconfigurable on-board package sorting in a delivery vehicle, including loading a plurality of bins in an enclosed storage compartment within the delivery vehicle on at least one horizontal plane, each bin configured to hold one or more packages and each bin having a computer readable identifier, scanning the computer readable identifier on each bin of the plurality of bins, the computer readable identifier providing data including at least a dimension of the bin, providing at least one set of correlated motorized conveyor belts on the horizontal plane, the set of correlated motorized conveyors belts sized as a function of the plurality of bins, with at least two conveyor belts linearly oriented on the horizontal plane, and at least two mixing conveyor belts, each mixing conveyor belt oriented adjacent to each conveyor belt to provide directional transition to a next conveyor belt of the at least two conveyor belt, and operating the set of correlated motorized conveyor belts to enable loading and unloading of packages by providing directional movement of the bins in at least one loop on the horizontal plane by selective rotation of each motorized conveyor belt based on the data from the scanned computer readable identifiers to selectively operate each motorized conveyor belt to relocate one or more of the bins.

Another embodiment is directed to a system for reconfigurable on-board package sorting in a delivery vehicle, including a memory that stores computer-executable instructions, and a processor configured to access the memory and execute the computer-executable instructions to direct loading of a plurality of bins in an enclosed storage compartment within the delivery vehicle on at least one horizontal plane, each bin configured to hold one or more packages and each bin having a computer readable identifier, receive scans of the computer readable identifier on each bin of the plurality of bins, the computer readable identifier providing data including at least a dimension of the bin, operate at least one set of correlated motorized conveyor belts on the horizontal plane, the set of correlated motorized conveyors belts sized as a function of the plurality of bins, with at least two conveyor belts linearly oriented on the horizontal plane, and at least two mixing conveyor belts, each mixing conveyor belt oriented adjacent to each convey belt to provide directional transition to a next conveyor belt of the at least two conveyor belts, and provide directional movement of the bins in at least one loop on the horizontal plane by selective rotation of each motorized conveyor belt based on the data from the scanned computer readable identifiers to selectively operate each motorized conveyor belt to relocate one or more of the bins for loading and unloading.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates an example system 100 that includes a delivery vehicle 120 configured with a storage compartment 130 accordance with an embodiment of the disclosure. The vehicle 120 may be one of various types of vehicles such as a gasoline powered vehicle, an electric vehicle, a hybrid electric vehicle, or an autonomous vehicle, that is configured as an automated or semi-automated vehicle. The delivery vehicle 120 may be implemented in a variety of ways and can include some components that are a part of the vehicle 120, and, in some embodiments, other components that are accessible via a communications network 140. The components that can be a part of the vehicle 120 can include an on-board computer 110 with a processor 112 and a memory 114 in communication with the network 140.

The on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.). In one or more embodiments, on-board computer may be located in storage compartment of delivery vehicle 120 to directly handle sorting operations. In one embodiment, on-board computer 110 passes data regarding vehicle location and a delivery schedule to a secondary on-board computer.

The on-board computer 110, in one or more embodiments, may be used to support features such as passive keyless operations, remotely-controlled vehicle maneuvering operations, and remote vehicle monitoring operations. On-board computer 110, in one or more embodiments, may execute certain operations associated with on-board package sorting in accordance with the disclosure. Further, in one embodiment, on-board computer 110 communicates with the internet over network 140 to receive delivery instructions, traffic information and the like.

The wireless communication system may include a set of wired or wireless communication nodes and/or sensors 150 mounted within a storage compartment of delivery vehicle 120 in a manner that allows the vehicle on-board computer 110 to perform sorting of packages. Examples of wireless communication sensors can be capable of reading computer readable identifiers via cameras, laser readers, and the like. In one or more embodiments, sensor 150 may further include one or more of Bluetooth®, or Bluetooth® low energy (BLE) sensors. Further, in one or more embodiments, sensor data may be enhanced or substituted with cloud-based network data communicated to delivery vehicle 130. Communications to on-board computer 110 can be hard-wired to sensor 150 or may use one or more of various wireless technologies such as Bluetooth®, Ultra-Wideband (UWB), Wi-Fi, ZigBee®, Li-Fi (light-based communication), audible communication, ultrasonic communication, near-field-communications (NFC), Bluetooth® low energy (BLE) and the like, for carrying out communications.

The on-board computer 110, may further connect via the communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, cellular, near-field communication (NFC), Wi-Fi, Wi-Fi direct, Li-Fi, acoustic or ultrasonic audio communication, Bluetooth Ultra-Wideband (UWB), machine-to-machine communication, and/or man-to-machine communication. In one or more embodiments, network 140 enables on-board computer 110 to communicate with the internet to receive delivery instructions, traffic updates and the like.

A software application may be provided in the on-board computer 110, which allows for performing operations for the delivery vehicle 120, and for monitoring some actions performed within the delivery vehicle 120. One example of an action performed autonomously or semi-autonomously by delivery vehicle 120 is a reconfigurable sorting operation. For example, in one or more embodiments, the reconfigurable sorting operation can be performed while delivery vehicle 120 is moving.

In the example procedure provided above, the vehicle computer 110 includes software and hardware that enables the reconfigurable sorting operation to take place while the vehicle is in motion. For example, in one embodiment, computer 110 includes software that enables bin selection from storage compartment based on schedule and/or vehicle location, such as based on GPS positioning or the like. Thus, sorting performed while delivery vehicle 120 is moving can include bin selection based on vehicle location.

Figure 2:
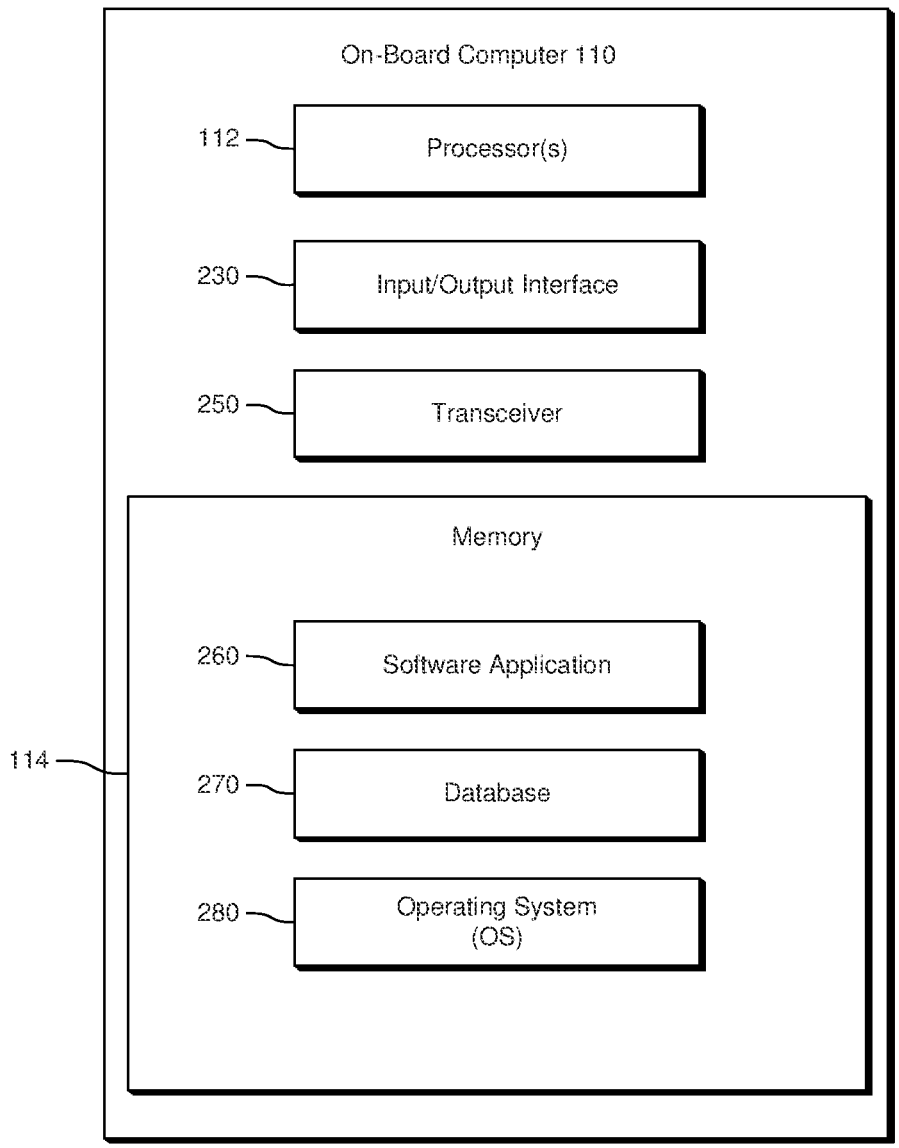
FIG. 2 illustrates some example functional blocks that may be included in on-board computer on the example delivery vehicle in accordance with an embodiment of the disclosure.

FIG. 2 illustrates some example functional blocks that may be included in the on-board computer 110 in accordance with an embodiment of the disclosure. The functional blocks of the on-board computer 110 may include a processor 210, memory 220, an input/output (I/O) interface 230, transceiver 250, software application 260, database 270, and an operating system (OS) 280. The I/O interface 230, may include a touchscreen having softkeys (graphical icons), and a biometric component (to enable facial recognition, a fingerprint scanner, or a microphone for voice command input). The operating system 280 can be any of various kinds of software used for operating vehicle systems (e.g., SYNC).

In one or more embodiments, software application 260 operates to carry out various actions for delivery vehicle 130.

The transceiver 250 can include a transmitter and/or a receiver that is used to communicate with an entity with instructions for moving boxes, such as the next delivery requiring reconfiguration of the storage compartment while the vehicle is moving. Such information may be received by on-board computer 110 or by a secondary computer within delivery vehicle 120 and transmitted to on-board computer 110.

The memory 220, which is one example of a non-transitory computer-readable medium, may be used to store the operating system (OS) 280, database 270, and various modules such as the software application 260. One or more modules in the form of computer-executable instructions may be executed by the processor 210 for performing various operations in accordance with the disclosure. More particularly, software application 260 may be executed by the processor 210 for directing movement of reconfigurable sorting. The software application 260, in one or more embodiments, may be executed for performing reconfigurable sorting within the vehicle in accordance with the disclosure.

Referring back to FIG. 1, in one or more embodiments, delivery vehicle 120 includes one or more horizontal planes within the storage compartment. FIG. 1 illustrates a top view of a horizontal plane showing a set of correlated motorized conveyor belts, 160, 162 and 164 and a set of mixing conveyor belts 170, 172 and 174. In one or more embodiments, at least two conveyor belts are linearly oriented such as belts 160, 162 and 164 and at least two mixing conveyor belts such as 170, 172 and 174, which are oriented adjacent to each, as shown. The set of correlated motorized conveyor belts 160-174 operate to enable loading and unloading of packages by providing directional movement of storage bins in at least one loop on the horizontal plane by selective rotation of each motorized conveyor belt.

The movements of the conveyor belts can be controlled by the on-board computer in conjunction with the computer readable identifiers on each bin. For example, instructions within the on-board computer software can identify a location of each of the plurality of bins and direct the operation of the set of correlated motorized conveyor belts to selectively operate each motorized conveyor belt to relocate one or more of the bins. In other embodiments, vehicle 120 can include a plurality of horizontal planes with correlated conveyors for moving bins holding packages or for packages themselves.

In one or more embodiments, the reconfigurable sorting system subdivides a delivery van's cargo space for different sizes of packages. In one or embodiments the system includes a set of cubical stackable bins to "normalize" packages for ease of movement inside the van. A bin can have one or more packages to increase space utilization.

Figure 3:
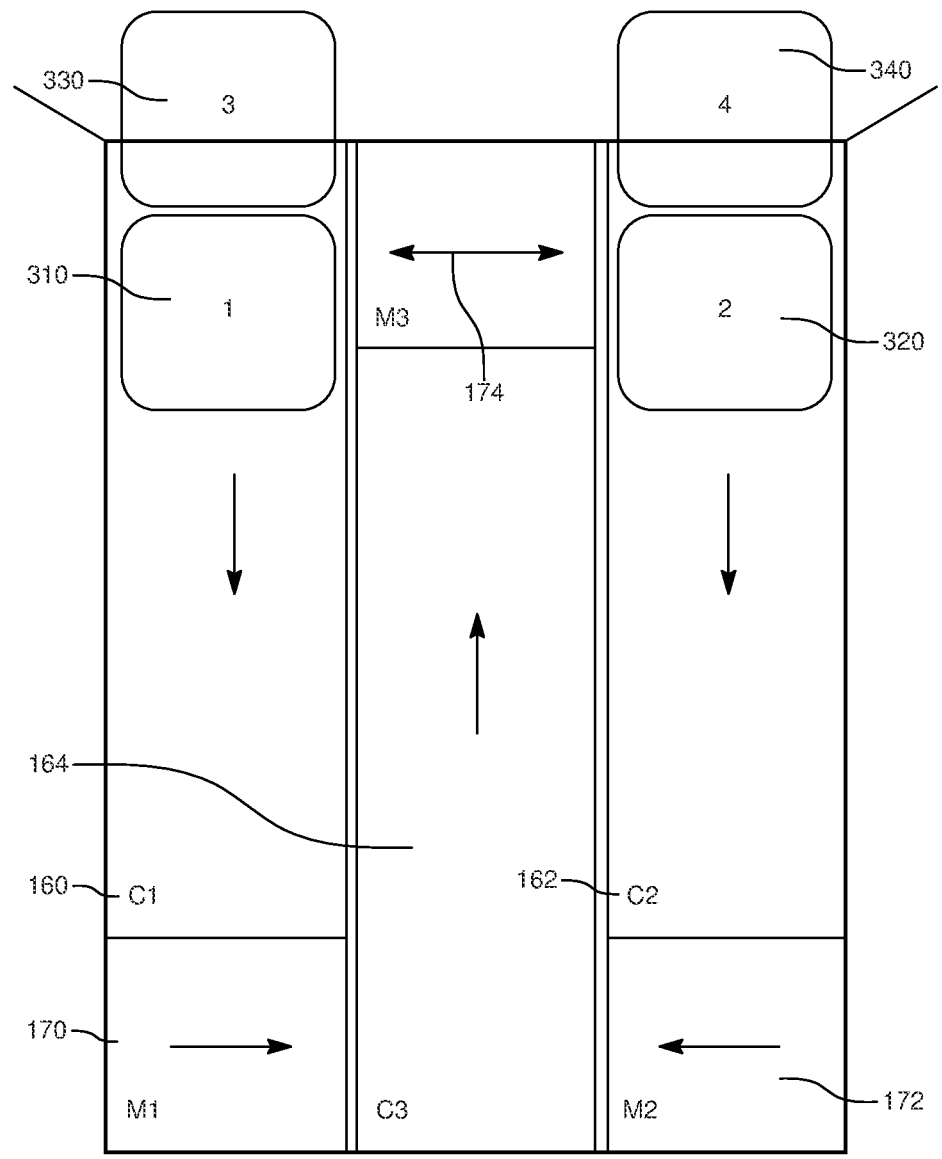
FIG. 3 illustrates a top view of a storage compartment of a delivery vehicle illustrating conveyor belts in accordance with an embodiment of the disclosure.
Figure 4:
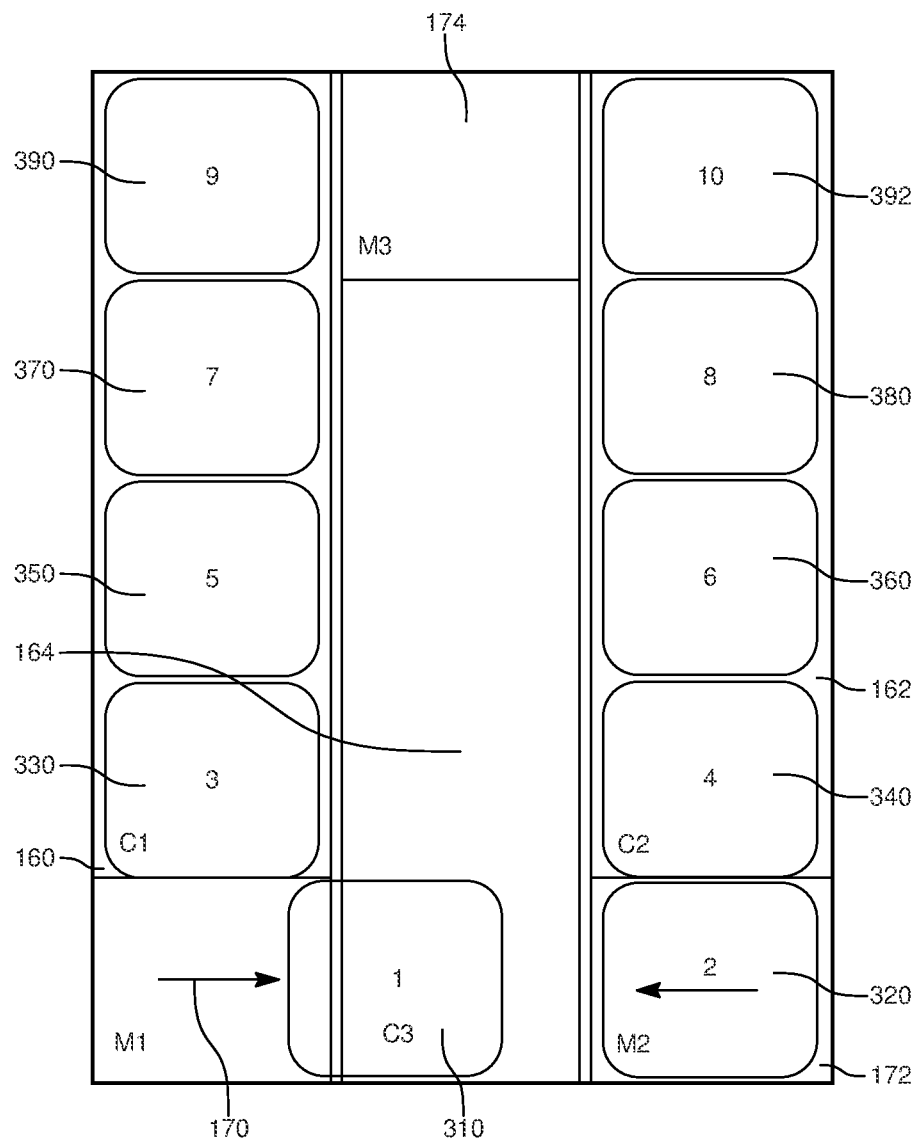
FIG. 4 illustrates an exemplary layout of bins during loading within a storage compartment of a delivery vehicle showing in accordance with an embodiment of the disclosure.
Figure 5:
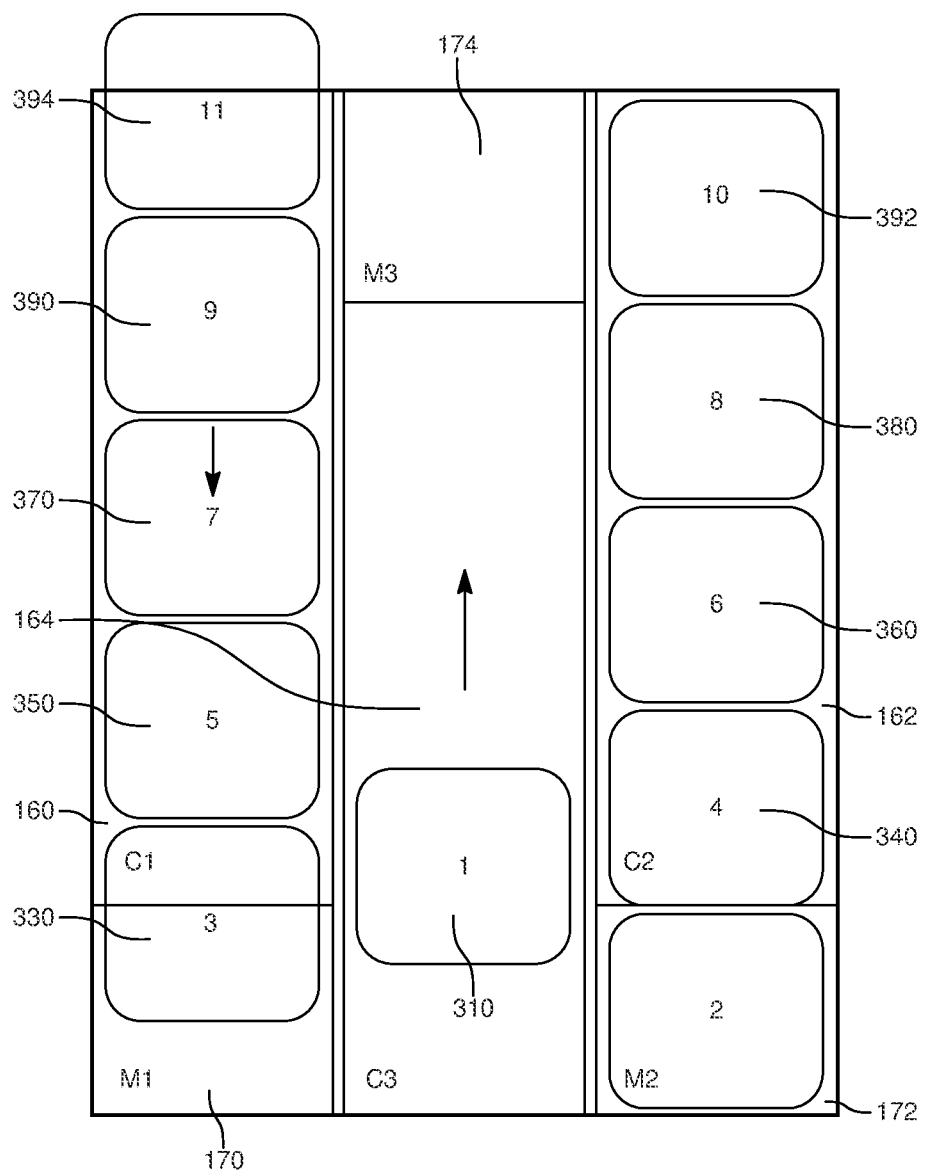
FIG. 5 illustrates an exemplary layout of bins during loading within a storage compartment of a delivery vehicle showing in accordance with an embodiment of the disclosure.

Referring to FIG. 3, bins 310, 320, 330 and 340 are shown being loaded into delivery vehicle 120. FIG. 4 illustrates the same bins 310, 320, 330 and 340 after bins 350-392 are loaded. As shown, when mixing conveyor 170 is operable, bin 310 is moved onto conveyor 164. Note that all other conveyors are off when bin 310 is being moved. Referring to FIG. 5, after bin 310 is moved onto conveyor belt 164, mixing conveyor belts 170, 172 and 174 are turned off and bin 310 is moved toward the back of the delivery vehicle 120 by conveyor 164.

Figure 7:
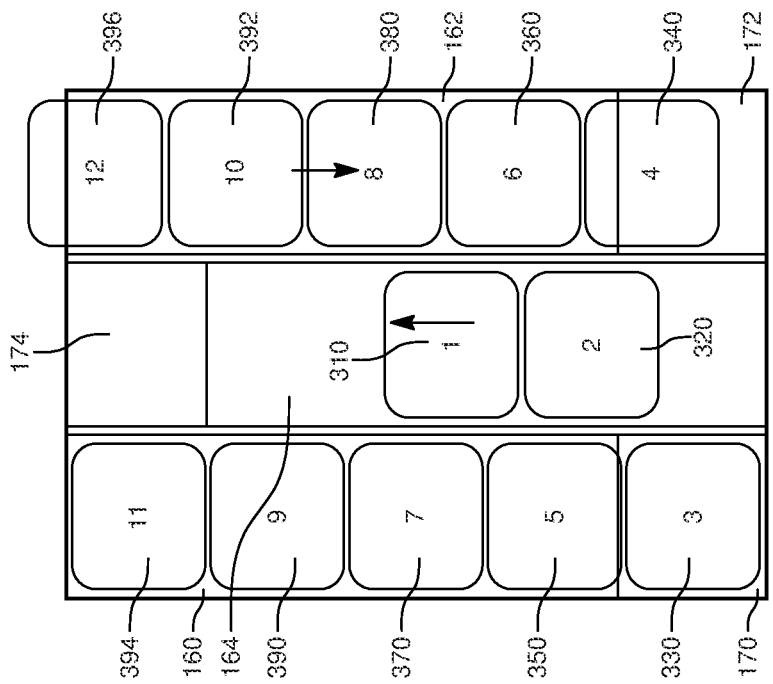
FIG. 7 illustrates an exemplary layout of bins during loading within a storage compartment of a delivery vehicle showing in accordance with an embodiment of the disclosure.
Figure 6:
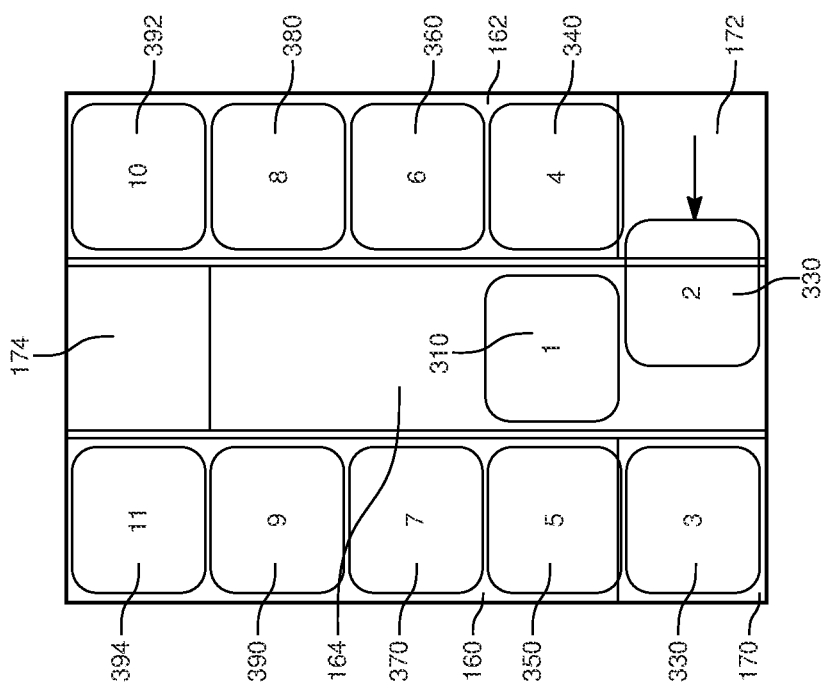
FIG. 6 illustrates an exemplary layout of bins during loading within a storage compartment of a delivery vehicle showing in accordance with an embodiment of the disclosure.
Figure 8:
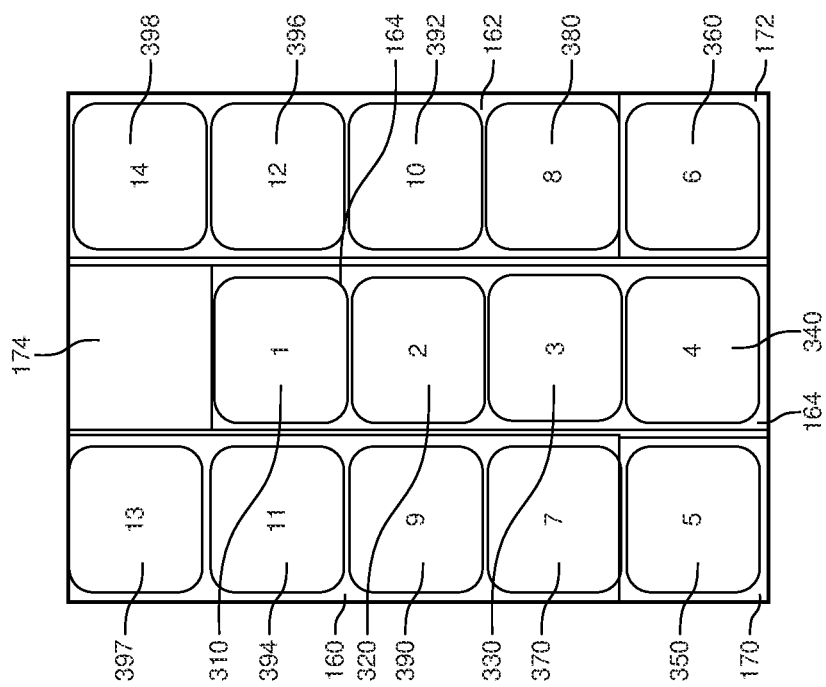
FIG. 8 illustrates an exemplary layout of bins during loading within a storage compartment of a delivery vehicle showing in accordance with an embodiment of the disclosure.

Referring to FIG. 6, as shown, all conveyors but mixing conveyor 172 are turned off allowing bin 330 to locate to conveyor 164. FIG. 7 illustrates conveyor 164 being active allowing bins 310 and 320 to progress. FIG. 8 illustrates a fully loaded delivery vehicle on the illustrated horizontal plane.

Figure 9:
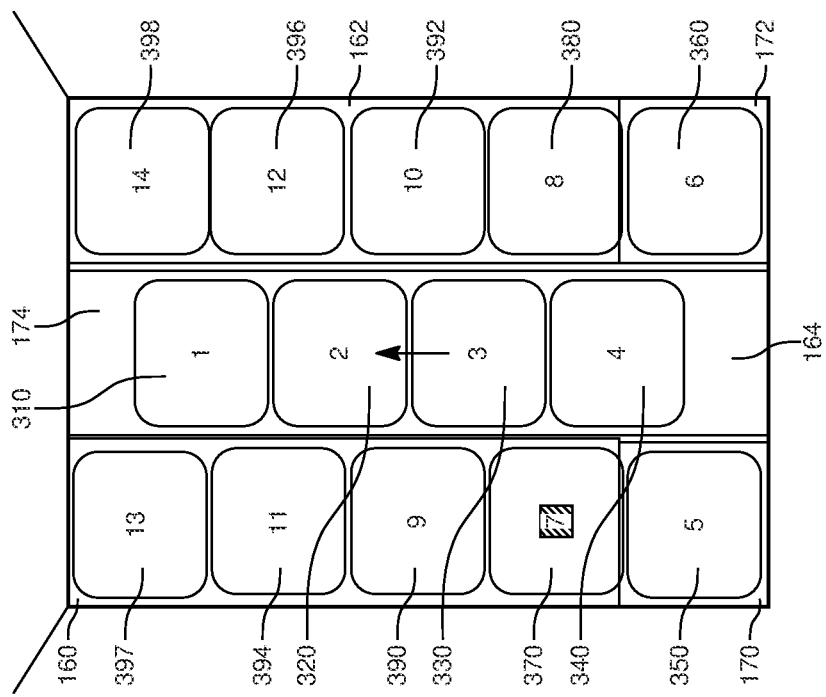
FIG. 9 illustrates an exemplary layout of bins during unloading within a storage compartment of a delivery vehicle showing in accordance with an embodiment of the disclosure.
Figure 13:
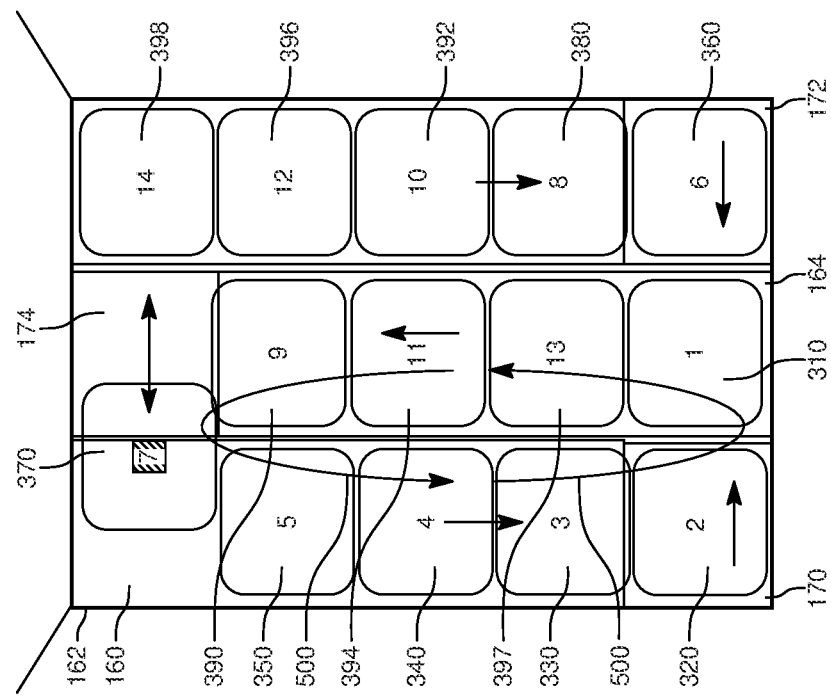
FIG. 13 illustrates an exemplary layout of bins during unloading within a storage compartment of a delivery vehicle showing in accordance with an embodiment of the disclosure.
Figure 12:
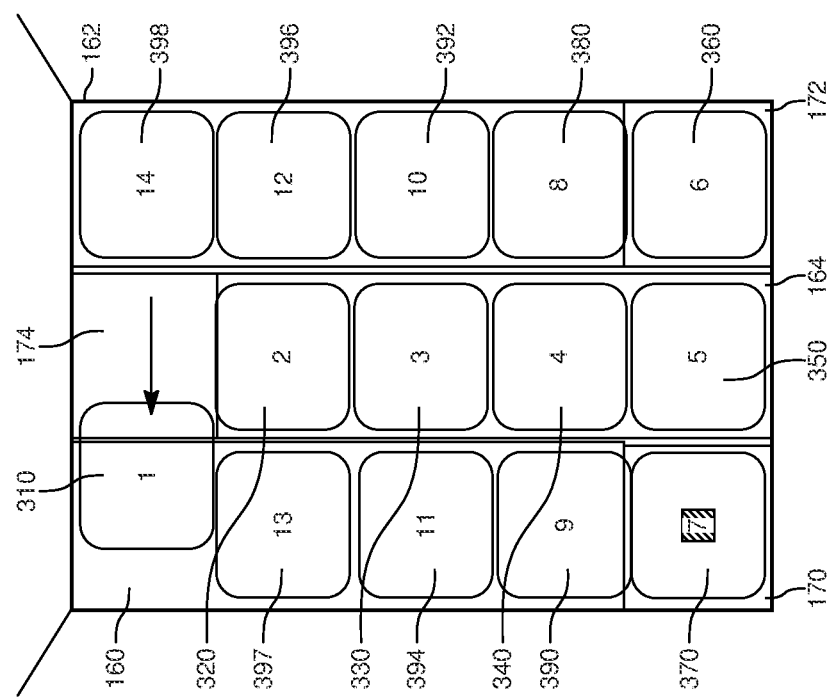
FIG. 12 illustrates an exemplary layout of bins during unloading within a storage compartment of a delivery vehicle showing in accordance with an embodiment of the disclosure
Figure 14:
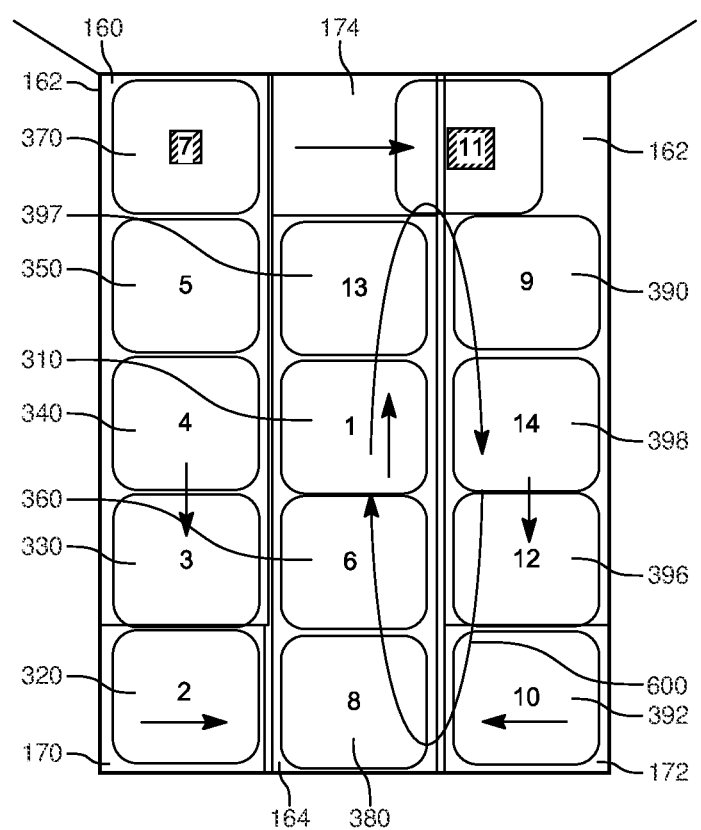
FIG. 14 illustrates an exemplary layout of bins during unloading within a storage compartment of a delivery vehicle showing in accordance with an embodiment of the disclosure.

FIGS. 9-14 illustrate an unloading sequence similar to FIGS. 6-8. As shown in FIG. 9, only conveyor 164 is active, which makes space available for bin 350. In FIG. 10, only mixer conveyor 170 is active which moves bin 350 to conveyor 164. In FIGS. 12-14, the same procedure enables a rotation loops 500 and 600, consecutively, to direct each bin to appear at the rear of the delivery vehicle 120 to enable easy removal of packages. As shown, once the procedure sequence is complete, bin 370 moves from the rear of the container the exit area of delivery vehicle 120.

When a bin, such as bin 370, is automatically brought to the exit of delivery vehicle 120, the driver can easily identify the package, such as in case of multiple packages in a bin. In one or more embodiments, the reconfigurable sorting system can operate while the vehicle is in motion, making packages ready for the driver to pick up and drop off upon stopping. In one or more embodiments, the system also has a sensing system for tracking the bins. In another embodiment, the system includes one or more individual "rows"/"conveyer" that can be dedicated for storing large items.

Embodiments of the reconfigurable sorting system enable horizontal auto-routing of packages in a cargo area with minimum number of actuated mechanisms while maximizing occupancy. The sorting can take place while delivery vehicle 120 is in motion. For example, shown in FIGS. 12-14, loops 500 and 600 enable presenting the bins in the correct sequence at the cargo door at each delivery point. Loops 500 and 600 utilize linear belts, thus optimizing packaging space. Precise timing of each belt may be employed to prevent bins from getting stuck. As shown, loops 500 and 600 share a common link, mixer conveyor belt 174, which can rotate in both directions, as necessary, thus minimizing the number of active parts needed. In some embodiments as shown, there may be three conveyor belts that move in a single direction, as well as three "mixer" belts for moving packages between the three conveyor belts.

Figure 15:
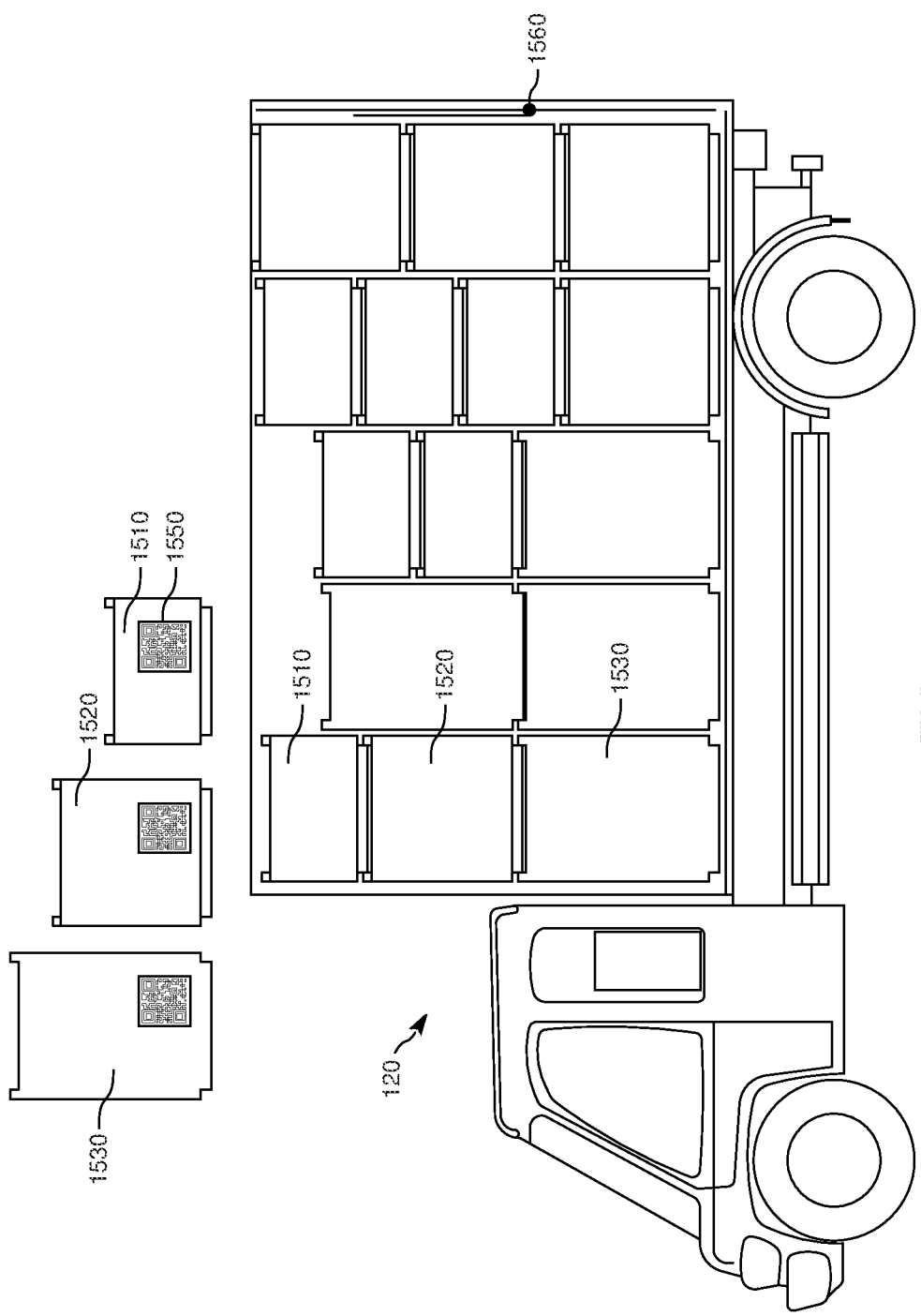
FIG. 15 illustrates a side view of a delivery vehicle including stackable containers and a sliding assembly incorporated with a door in accordance with an embodiment of the disclosure.

Referring now to FIG. 15, one embodiment provides for vertical storage efficiency by using a single horizontal plane with conveyor belts and stackable containers. As shown, Delivery vehicle 120 illustrates a side view of the reconfigurable sorting system with three different size storage bins, small 1510, medium 1520 and large 1530. Organization of the bins is enhanced by including a computer readable identifier 1550 on each bin. The computer readable identifier can be a Quick Read Code (QR) code, or some other computer readable mark. In one or more embodiments, the QR code provides a container's dimensions and an identifier to enable software, such as software in on-board computer 110 to track the overall height within storage compartment 130. Thus, stackable containers can be stacked on top of each other to form a column with a known height. Each container column can then be moved as a single unit on the horizontal plane, so that each column can be presented near a door for delivery. Once the columns are presented at a rear door, a sliding assembly on the inside of the door 1560 with pivoting arms can be inserted between boxes in the column containing the packages for delivery.

Figure 16:
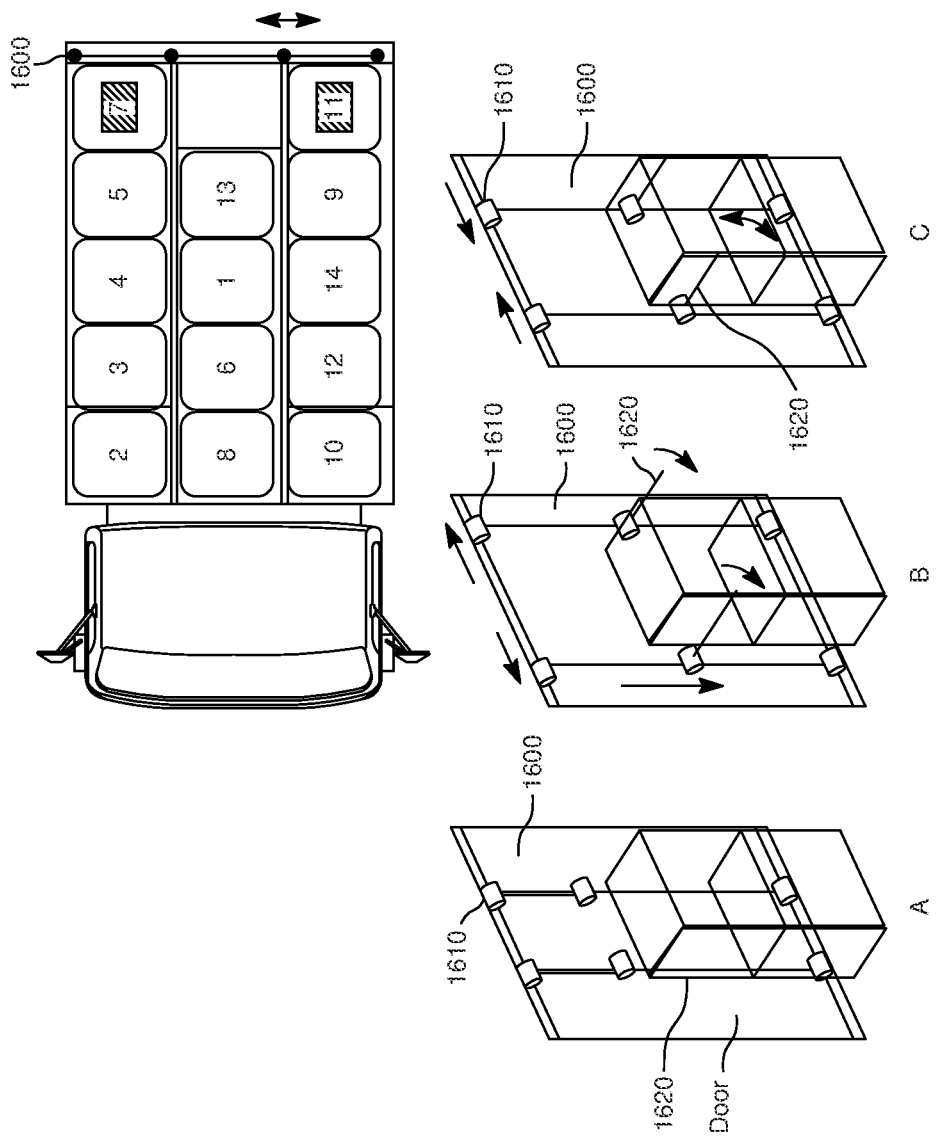
FIG. 16 illustrates a top view of a delivery vehicle including stackable containers and a sliding assembly incorporated with a door in accordance with an embodiment of the disclosure.

Referring now to FIG. 16, a top view of a delivery vehicle 120 is shown with columns shown on a horizontal plane with conveyor belts as described above. Door 1600 is shown including a sliding assembly 1610. The operation of the sliding assembly 1610 is shown in sequence A, B and C. As shown, in A, the sliding assembly 1610 is at rest with pivoting arms 1620 at rest flush against the door 1600. Next, at B, the sliding assembly is shown spread horizontally with pivoting arms 1620 extended. In C, the sliding assembly 1610 is horizontally narrowed to squeeze the container, and the pivoting arms 1620 grab the container to prepare the container for the door 1600 to open and present the container with packages for delivery.

Pivoting arms 1620 are each mounted on sliding assembly 1610 on the inside of each door 1600 and can be used for insertion between stackable containers in the columns containing the package-to-be-delivered. Thus, the sliding assemblies 1610 operate as the columns are pushed toward door 1600. In one embodiment, sliding assemblies 1610 are disposed inside of each door 1600 with pivoting arms 1620 sliding up and down rails. As shown, in FIG. 17, the vertical guides of are attached to each pivoting arm 1620 so that can fully retract vertically or protrude out horizontally.

Figure 17:
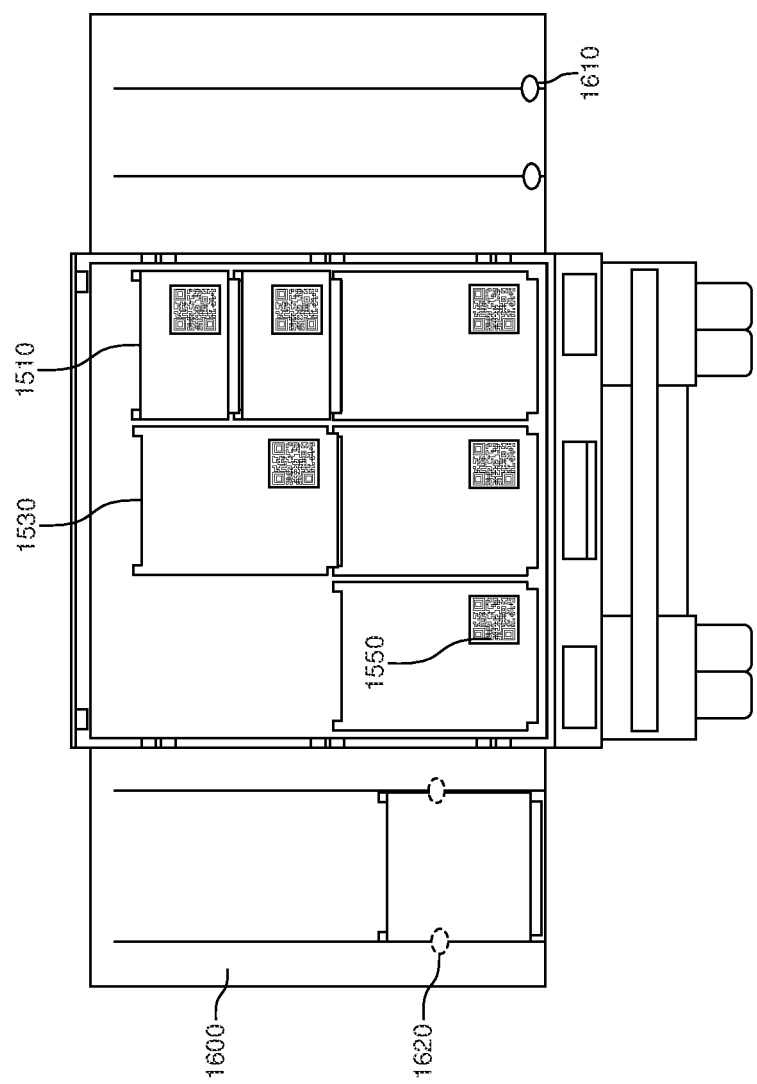
FIG. 17 illustrates a rear view of a delivery vehicle including stackable containers and a sliding assembly incorporated with a door in accordance with an embodiment of the disclosure.

FIG. 17 illustrates a rear view of delivery vehicle 120 is shown including door 1600, and sliding assembly 1610 with pivot arms 1620 engaged on a container. As shown large containers 1530 and small containers 1510 are organized in columns.

As shown in FIG. 17, when a top container is lifted to disengage from a bottom container, the sliding assembly 1620 uses pivot arms 1620 to disengage the top container from the bottom container. When door 1600 opens, the container with the pivot arms swings outside with the door and then the container is lowered. With the stacked column now unstacked and separated, the container on the door and the container left inside the delivery vehicle 120 are easily accessible for delivery. In one or more embodiments, a sliding assembly is coupled to door 1600 at each linear conveyor belt end to align with rows of stacked containers.

In one embodiment, QR code 1550 on each container provides data to indicate to the sliding assembly where to horizontally move the vertical guides pivot mechanism and where to vertically move the pivoting arm 1620 to pick up the correct container. The vertical guides move a little extra sideways so that pivoting arm 1620 can pivot horizontally, and then slide back to engage the pivoting arm 1620 to the side of a container. In one or more embodiments, an indent on the surface of each container enables effective container handling. The container is lifted to disengage from a bottom container so that when door 1600 opens containers which were previously inaccessible due to height are now within the reach of an operator.

Figure 18:
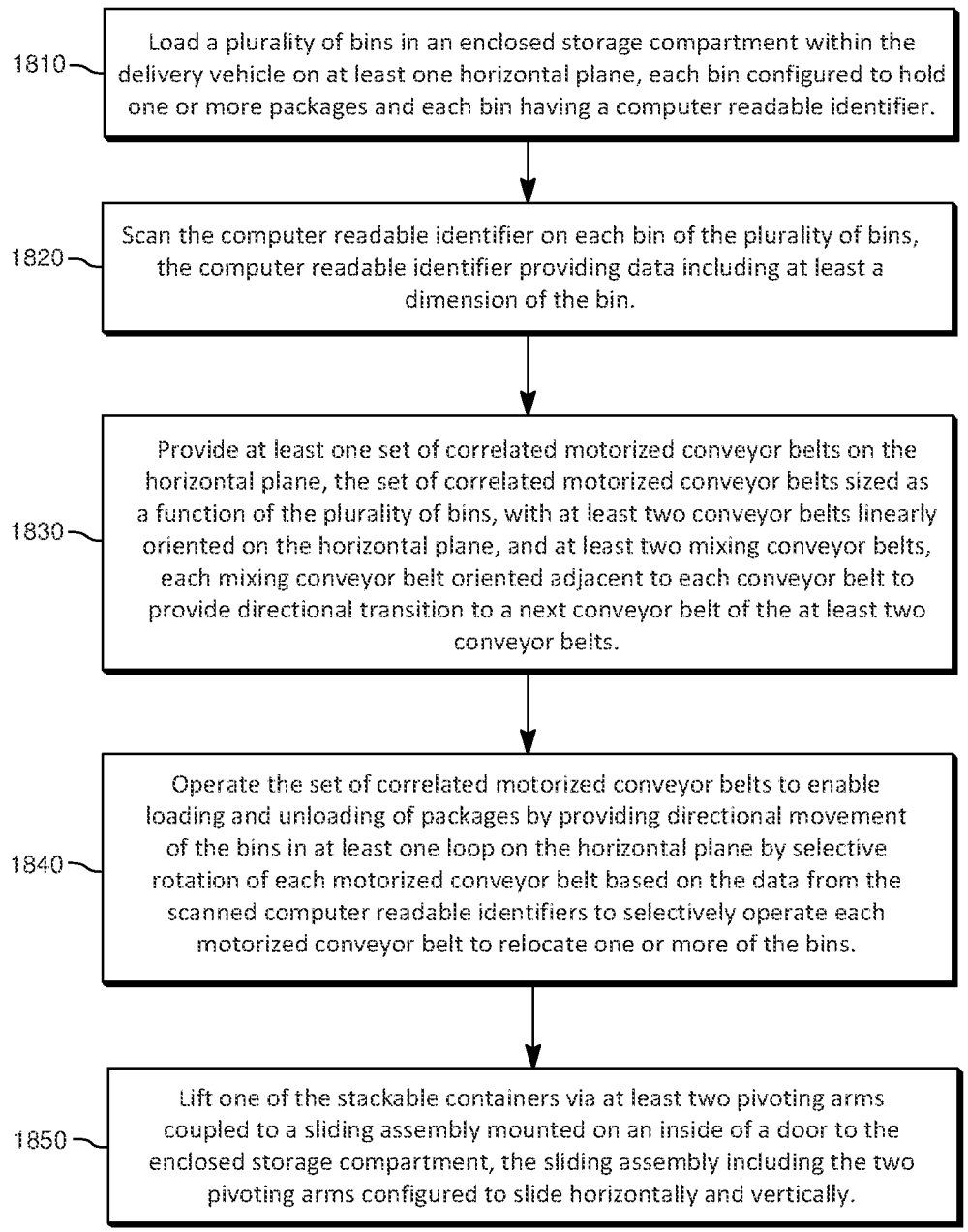
FIG. 18 illustrates a flow diagram of a method in accordance with an embodiment of the disclosure.

Referring to FIG. 18, a flow diagram illustrates a method for reconfigurable on-board package sorting in a delivery vehicle in accordance with an embodiment of the disclosure. As shown, block 1810 illustrates loading a plurality of bins in an enclosed storage compartment within delivery vehicle 120 on at least one horizontal plane, each bin configured to hold one or more packages and each bin having a computer readable identifier. For example, as shown in FIG. 1, delivery vehicle 120 includes a storage compartment 130 for holding bins.

Block 1820 provides for scanning a computer readable identifier on each bin of the plurality of bins, the computer readable identifier providing data including at least a dimension of the bin. For example, as shown in FIG. 1 a scanner 150, which can be located on delivery vehicle 120, or handheld using wireless communications, can scan identifiers, such as QR codes located on each bin.

Block 1830 illustrates providing at least one set of correlated motorized conveyor belts on the horizontal plane, the set of correlated motorized conveyors belts sized as a function of the plurality of bins, with at least two conveyor belts linearly oriented on the horizontal plane, and at least two mixing conveyor belts, each mixing conveyor belt oriented adjacent to each conveyor belt to provide directional transition to a next conveyor belt of the at least two conveyor belts. For example, as shown in FIG. 1 conveyors 160, 162, 164 are oriented linearly and mixing conveyors 170, 172 and 174 are oriented adjacent thereto.

Block 1840 provides for operating the set of correlated motorized conveyor belts to enable loading and unloading of packages by providing directional movement of the bins in at least one loop on the horizontal plane by selective rotation of each motorized conveyor belt based on the data from the scanned computer readable identifiers to selectively operate each motorized conveyor belt to relocate one or more of the bins. For example, on-board computer 110 receives data from scanner 150 that reads QR codes or other computer readable identifiers on bins within storage compartment 130, and selectively rotates the conveyors 160, 162, 164, 170, 172, 174 until the bins are properly placed.

Block 1850 provides for lifting one of the stackable containers via at least two pivoting arms coupled to a sliding assembly mounted on an inside of a door to the enclosed storage compartment, the sliding assembly including the two pivoting arms configured to slide horizontally and vertically. For example, as shown in FIG. 16, sequence A, B and C illustrates a door 1600 with a sliding assembly 1610 mounted on the inside of the door, the sliding assembly 1610 including two pivoting arms 1620.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 320, the memory 420, and the memory 520, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A reconfigurable on-board package sorting system for a delivery vehicle, comprising:
    an enclosed storage compartment including at least one horizontal plane;
    a plurality of bins for holding packages, each bin including a computer readable identifier, wherein the plurality of bins comprise a plurality of stackable containers, each with the computer readable identifier, the computer readable identifier providing a listing of container dimensions, wherein the listing of container dimensions enables a calculation of stacking height for a combination stackable container to form a column within the enclosed storage compartment;
    at least one set of correlated motorized conveyor belts on each horizontal plane, the set of correlated motorized conveyors belts sized as a function of the plurality of bins, including:
        at least two conveyor belts linearly oriented on the horizontal plane;
        at least two mixing conveyor belts, each mixing conveyor belt oriented adjacent to each conveyor belt to provide directional transition to a next conveyor belt of the at least two conveyor belts, wherein the set of correlated motorized conveyor belts operate to enable loading and unloading of packages by providing directional movement of the bins in at least one loop on the horizontal plane by selective rotation of each motorized conveyor belt;
    an on-board computer including a processor and memory configured to receive data from each computer readable identifier, the processor including instructions to:
        identify a location of each of the plurality of bins; and
        direct operation of the set of correlated motorized conveyor belts to selectively operate each motorized conveyor belt to relocate one or more of the bins;
    a door integrated with the enclosed storage compartment; and
    a sliding assembly mounted on an inside of the door, the sliding assembly including at least one pivoting arm configured to slide horizontally and vertically, the at least one pivoting arm comprising a first pivoting arm and a second pivoting arm spaced from the first pivoting arm, assembly being movable between a first position and a second position when the door is in a closed position, wherein, when the sliding assembly moves from the first position toward the second position, the first and second pivoting arms move toward one another in order to grab one of the plurality of stackable containers, such that when the door is moved from the closed position to an open position, the one of the plurality of stackable containers swings outside with the door.

2. The system of claim 1 wherein each stackable container includes a recessed area for enabling the pivoting arm to attach to one of the stackable containers for access at the door.

3. The system of claim 1 wherein the door is a pair of swing doors with the sliding assembly on the inside of each door, the sliding assembly coupled to the pivoting arm that inserts between the stackable containers in the stack of containers when pushed toward the door.

4. The system of claim 1 wherein the computer readable identifier is a matrix bar code, a quick response (QR) code, or globally unique identifier.

5. The system of claim 1 further comprising:
a scanner configured to read each computer readable identifier on each bin and provide data to the on-board computer.

6. The system of claim 1 wherein the computer readable identifier provides data to identify a location where the pivoting arm can engage one of the plurality of stackable containers.

7. The system of claim 1 wherein the computer readable identifier provides data to identify a location and size of each of the plurality of bins.

8. The system of claim 1 further comprising:
a sensor coupled to the enclosed storage compartment and the on-board computer, the sensor including one or more of a QR reader, a camera, and a counter and a weight system, the sensor coupled to the on-board computer to provide the location of each of the plurality of bins.

9. A method for reconfigurable on-board package sorting in a delivery vehicle, comprising:
disposing a plurality of bins in an enclosed storage compartment within the delivery vehicle on at least one horizontal plane, each bin configured to hold one or more packages and each bin having a computer readable identifier;
scanning the computer readable identifier on each bin of the plurality of bins, the computer readable identifier providing data including at least a dimension of the bin;
providing at least one set of correlated motorized conveyor belts on the horizontal plane, the set of correlated motorized conveyors belts sized as a function of the plurality of bins, with at least two conveyor belts linearly oriented on the horizontal plane, and at least two mixing conveyor belts, each mixing conveyor belt oriented adjacent to each conveyor belt to provide directional transition to a next conveyor belt of the at least two conveyor belts; and
operating the set of correlated motorized conveyor belts to enable loading and unloading of packages by providing directional movement of the bins in at least one loop on the horizontal plane by selective rotation of each motorized conveyor belt based on the data from the scanned computer readable identifiers to selectively operate each motorized conveyor belt to relocate one or more of the bins;
providing a plurality of stackable containers, each with the computer readable identifier, the computer readable identifier providing a listing of container dimensions, wherein the listing of container dimensions enables a calculation of stacking height for a combination stackable container to form a column within the enclosed storage compartment;
lifting one of the stackable containers via at least two pivoting arms coupled to a sliding assembly mounted on an inside of a door to the enclosed storage compartment, the sliding assembly including the two pivoting arms configured to slide horizontally and vertically, the two pivoting arms arm comprising a first pivoting arm and a second pivoting arm spaced from the first pivoting arm, assembly being movable between a first position and a second position when the door is in a closed position, wherein, when the sliding assembly moves from the first position toward the second position, the first and second pivoting arms move toward one another in order to grab the one of the plurality of stackable containers, such that when the door is moved from the closed position to an open position, the one of the plurality of stackable containers swings outside with the door.

10. The method of claim 9 wherein the computer readable identifier is a matrix bar code, a quick response (QR) code, or globally unique identifier.

11. The method of claim 9 wherein the sliding assembly is located on the inside of each door, the sliding assembly using the first and second pivoting arms to insert between columns of stackable containers.

12. The system of claim 1 wherein the first and second pivoting arms each extend from and are coupled to the door at a first end.

13. The system of claim 12, wherein the first end is configured to move in a plane parallel to a plane of the door.

14. The method of claim 9 wherein the first and second pivoting arms each extend from and are coupled to the door at a first end.

15. The method of claim 14 wherein the first end is configured to move in a plane parallel to a plane of the door.

* * * * *